Nov. 17, 1942. W. K. EDWARDS 2,302,536
LIQUID LEVEL INDICATOR
Filed May 9, 1940
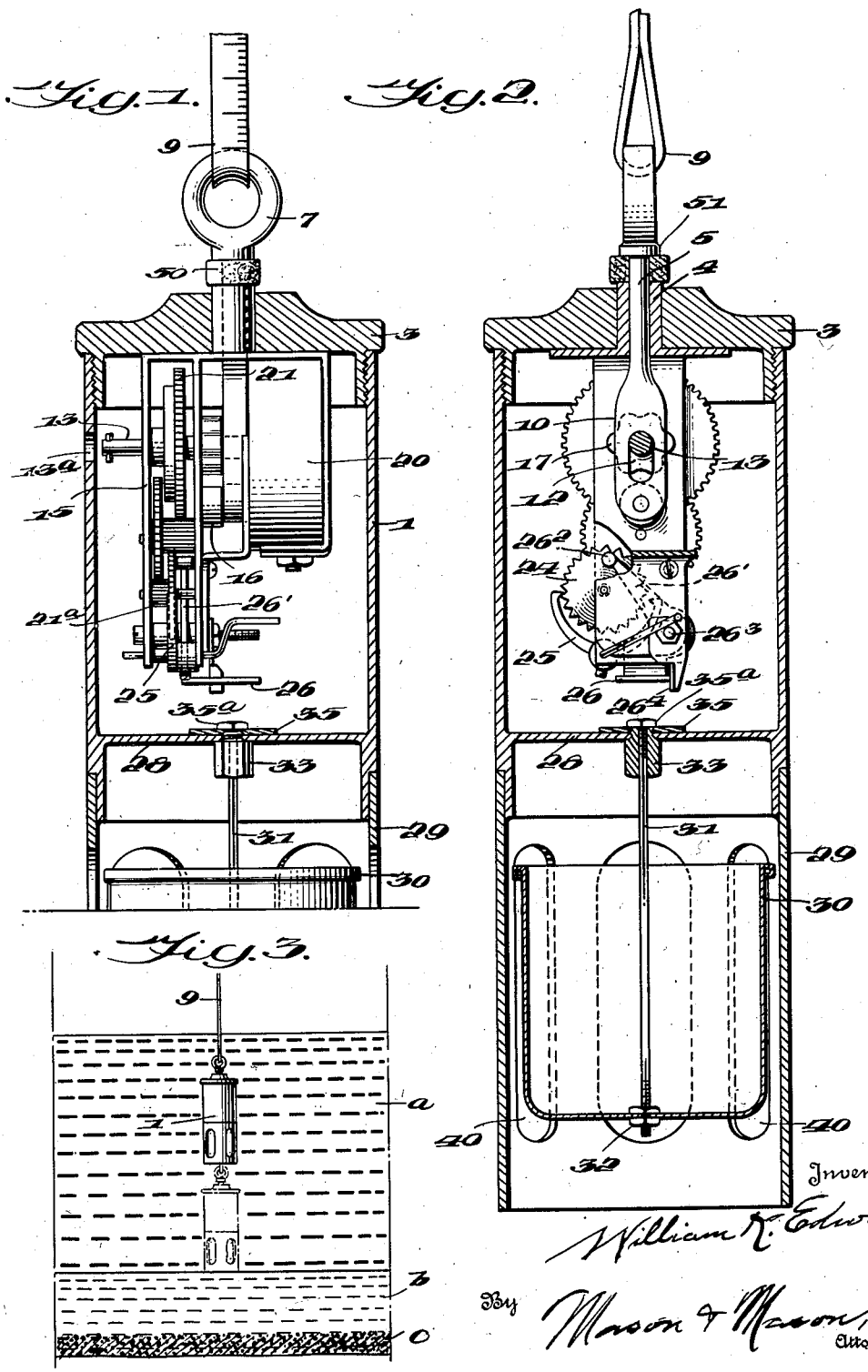

Patented Nov. 17, 1942

2,302,536

UNITED STATES PATENT OFFICE 2,302,536

LIQUID LEVEL INDICATOR

William K. Edwards, Big Spring, Tex.

Application May 9, 1940, Serial No. 334,282

5 Claims. (Cl. 73—290)

This invention relates to indicating devices for ascertaining by vibration the successive levels of liquids of varying densities, as for example, the varying levels of oil, water, and sedimentary deposit in oil wells, tanks, or containers.

Oil wells ordinarily contain besides the oil, an underlying layer of water, and below the water ordinarily a layer of sedimentary matter, which is much denser than the water or oil. These various substances are arranged in accordance with their specific gravities in a well, tank or container. In either case it is desirable to measure the depth of these various substances in order to determine the correct immersion depth before a pump is lowered into an oil well that the suction member of the pump may be immersed only the proper distance in the well to remove the oil from above the layer of water. Where it is desired to determine the number of gallons of oil in a tank, the depth of the layer of oil in said tank which is superposed upon the heavier layer of water, or water mixed with brine, as the case may be, may be determined by this apparatus.

With a view to determining these various levels, this invention comprises as a very important feature, a device which includes a casing and a movably mounted cup therein. A motor-driven clock mechanism, or its equivalent, is located above the cup, and a suspension tape for the device preferably having graduations thereon is adapted to be lowered by hand into the liquid. Preferably, and as a feature of the invention, the cup is so arranged that when it meets the first body of liquid during the lowering process, upward movement of the cup in its casing, due to its buoyancy, will cause the tripping of a detent, thereby releasing through the clock mechanism a rotatable member which is provided with a cam wheel engaging a member connected with the suspending tape. The tripping of the clock mechanism through contact between the movable cup and the first liquid encountered, will set up a vibration in the suspending tape which is transmitted to the hand of the operator, thereby indicating that the first liquid level has been encountered by the apparatus. An indication, as of inches upon the tape, will then apprise the operator of the extent to which the device has been lowered before the first layer of liquid is encountered. Upon a further lowering of the device, the cup will then be filled with the liquid, as oil, and the trip device actuated through the instrumentality of the cup, will be released momentarily.

Thereafter as the device is lowered further into the oil, the trip device will not be actuated until the cup encounters a denser liquid than the oil, such as water or brine. The contact of the cup with this denser liquid will cause a second relative movement between the cup and its casing, and a second actuation of the tripping device due to such relative movement, thereby again releasing the clock mechanism and permitting the vibrating element to operate, thus apprising the operator of the fact that the denser liquid has been encountered. He may then observe the length of tape in inches between the numeral indicating the first actuation of the vibrator and the numeral indicating the second actuation thereof, and from such length of tape may determine the amount of oil above the water level. This amount may be determined in gallons by a simple calculation when the diameter of the tank is known.

Other features of the invention than those above enumerated including important details of construction and combinations of parts will be better understood from the following detailed description when considered with the accompanying drawing, in which:

Figure 1 is a view in vertical section with some parts shown in elevation, of the upper part of the apparatus, including a portion of the movable cup;

Figure 2 is a vertical section taken at right angles to Figure 1, and

Figure 3 is a diagrammatic view, illustrating the operation of the apparatus.

The casing 1, preferably cylindrical, is provided with an internal thread at its upper end to receive a cap 3, herein shown with a bushing 4, fitting an aperture in said cap, which bushing is provided with a central bore through which is mounted for limited reciprocation a stem 5 provided with an eye 7 which is suspended from a tape 9 having measuring graduations in inches, feet, or any desired units.

The lower end of the stem 5 is provided with a yoke 10 having therein a slot 12 which permits reciprocal movement about a shaft 13 rotatably mounted in a suitable frame 15 secured inside of the cap 3. The lower end of the yoke 10 is provided with a roller 16 which is held by the weight of the casing 1 and its contents when the latter is suspended from the tape, in engagement with a cam wheel 17 comprising a plurality of projections and intermediate depressions. Rotation of the shaft 13 will cause rotation of the cam wheel, and through the connection of the roller 16 with the cam wheel, impart vertical vibratory movement to the stem 5 and eye 7, and hence to the tape 9 which is held by the operator.

The shaft 13 has connected therewith a motor spring 20. Said shaft at its opposite end is constructed to be fitted by a winding key which may be inserted through an aperture 13a in the wall of the casing 1. Said shaft also carries a gear 21 which is part of a train of gears for transmitting rotary motion from the motor spring to a pinion 21a. The shaft of this pinion carries an escapement 24 which is engaged by pawls 25 which intermittently engage the escapement as the latter rotates. The escapement is provided with a projecting stop pin 26² adapted to contact with the end of an arm 26', which is integral with and projects upwardly from a trip member 26. As shown in Figure 2, the arm 26' of the trip member is interposed in the path of the pin 26², thereby holding the escapement 24 and the remaining gears and pinions of the clock mechanism stationary.

The casing 1 is provided with a partition 28, and therebelow with an extensible skirt 29. A buoyant cup 30 is enclosed within the skirt 29, and said cup has a stem 31 secured by clamping nuts 32 to the bottom of the cup through which a threaded end of the stem extends and is engaged by said nuts. The stem 31 extends upwardly through a bore in a nut 33 which is secured to the partition 28, and the extreme upper end of the stem is provided with an arresting nut or stop 35a which, as shown, normally rests upon a washer 35 to hold the cup suspended in the skirt 29, the latter being provided with suitable slots or openings 40, to admit liquid freely thereinto when the device is submerged in a body of liquid.

The stop nut 35a is positioned directly beneath the trip member 26, and when the device is submerged in liquid, the cup is first moved upwardly and the stop nut 35 engages the trip 26. This swings the arm 26' out of engagement with the pin 26² and permits rotation of the escapement 24 and the remaining wheels of the train in the clock mechanism under the stress of the motor spring 20, and, through the connection of the roller 16 with the cam wheel, sets up a vibratory motion in the stem 5 and tape 9.

In operation, with the parts as shown in Figure 2 of the drawing, the apparatus is lowered into a tank or body of liquid which contains a layer of oil a, (see Figure 3), a layer of water or brine b, therebelow, and an underlying layer of sand, sludge or other sedimentary matter c, these substances being arranged in accordance with their specific gravities. When the apparatus has been lowered sufficiently for the cup 30 to engage the surface of the body of oil a, a resistance to the further downward movement of the cup in its casing is encountered, due to the buoyancy of the cup, which causes the cup to move up until the stop nut 35a engages the trip 26. This releases the escapement 24 and permits the clock mechanism to operate, thus rotating the cam wheel 17 and causing vibratory motion of the tape, which warns the operator that the oil level has been reached by the apparatus. He immediately observes the indicating unit on the tape and makes a note thereof. The apparatus is then lowered further into the oil, the cup 30 fills with oil and is caused to descend and release the trip device 26, thus permitting the arm 26' to fall into position for contact with the pin 26² which arrests the movement of the escapement 24 and the connected members of the clock mechanism, and thereby stops the vibratory motion imparted to the tape. The continued lowering of the apparatus in the oil will, when the apparatus has reached the level of the water b, cause a second upward movement of the cup and engagement with the trip device, to effect vibration of the tape and apprise the operator that the device has reached the denser liquid, such as water or brine. Notation is then made of the mark on the tape which indicates the level that the apparatus has reached when water or brine is encountered. The operator may then determine the depth of the oil, and by a calculation determine the number of gallons of oil in the container.

If it is desired furthermore to ascertain the depth of the water b, the apparatus is lowered a further distance whereupon the cup 30 will be filled with water, the trip device 26 released through the lowering of the cup and stop member 35a, and as the apparatus is lowered a further distance in the tank, container or oil well, the depth of the water underlying the layer of oil may be ascertained from the notation on the tape when the third tripping of the vibratory member takes place. The depth of the layer of water is ascertained in the same manner that the depth of the layer of oil was ascertained. The stem 5 is provided with a shoulder 51, and surrounding the stem is a cushioning washer 50 which acts as a buffer to prevent violent contact with the bushing 4 during the vibrations of the stem 5 and tape.

From the foregoing description, it is believed that the operation of this device will be clear without further explanation. The right is reserved to make such changes in the details of construction or arrangement of the parts as may be contemplated by the invention, as defined by the appended claims.

I claim:

1. In a device of the class described, the combination of a container provided with means to admit liquid to its lower portion, a measuring tape, means for suspending the container from said tape including a vibratory element, a clock mechanism within the container having a cam engaging the said element constructed and arranged to effect vibration of said element when operated, a buoyant cup suspended within the container with capacity for limited vertical movement therein, a trip device for the clock mechanism, and means connected with the cup to operate said trip device for initiating the movement of the clock mechanism to thereby operate said vibratory element.

2. In a device of the class described, the combination of a container having a partition therein and having openings below said partition, a buoyant cup provided with a stem terminating in a stop device, said stem reciprocating through said partition and arranged to suspend the cup therebelow, clock mechanism in the container above said partition having thereon a trip device, a vibration creating means connected with said clock mechanism, and means for suspending the device in a body of liquid, said means including an element cooperating with said vibration creating means to effect vibration in the suspending device when said trip is actuated by engagement with said stop device as said cup is moved relatively to said container upon contact of said cup with a body of liquid.

3. In a device of the class described, the combination of a container having a partition therein and having openings below said partition, a buoyant cup provided with a stem slidingly mounted through said partition and having a stop for engagement with the partition to suspend the cup below the partition, clock mechanism including a trip device located in the container above the partition and having a cam wheel to be actuated by said mechanism, a suspending yoke provided with a stem to reciprocate through an aperture in the top of said container and arranged for suspending the device while lowering it in a body of liquid, and means carried by said yoke arranged to be held in engagement with said cam wheel when the device is suspended, said parts being adapted to set up a vibratory motion in the suspending means upon actuation of the trip through contact with the stop on the stem of the cup to effect release of said strip device and permit the clock mechanism to operate.

4. In a device of the class described, the combination of a casing having an apertured skirt, a cup suspended therein with capacity for limited movement relative to the casing, a suspending means for said casing, vibrating means between said casing and suspending means, a clock mechanism for operating said vibrating means, a trip device for releasing and arresting the movements of said clock mechanism, means whereby when vertical movement of the cup is arrested by contact with a body of liquid and the casing descends relative to said cup, the clock mechanism will be released by said trip and a vibratory motion set up in the suspending means by said vibratory means to apprise the operator that the cup has engaged said liquid.

5. In a device for determining successive levels of a plurality of liquids of different specific gravities in a tank, well, or the like, the combination of a container, clock mechanism therein, means for suspending the container and clock mechanism including an element to impart vibration to said means when the device is lowered in said liquids, a vertically moving buoyant cup suspended in said container and free for successive up and down movements due, respectively, to its buoyancy upon contact with the liquid and to its weight when filled with liquid, said container constructed to permit free access of liquid to said cup, trip mechanism to release and arrest the operation of the clock mechanism upon successive reciprocations of said cup, and a cooperating vibrating element driven by said clock mechanism constructed and arranged to be operated upon release of the clock mechanism by said trip.

WILLIAM K. EDWARDS.